Patented Sept. 30, 1952

2,612,501

UNITED STATES PATENT OFFICE 2,612,501

TRIAZINE SUBSTANCES FOR TEXTILE TREATMENT

Robert H. Wilson, Blackley, Manchester, England, assignor to Imperial Chemical Industries Limited, a corporation of Great Britain No Drawing. Application October 8, 1948, Serial No. 53,600. In Great Britain October 14, 1947

11 Claims. (Cl. 260—247.1)

1

This invention relates to new substances for textile treatment and in particular it relates to a process for the manufacture of new substances useful for producing a whitening effect on textile materials.

It is known that by applying to textile materials certain stilbene derivatives, such as for example 4:4'-diaminostilbene-2:2'-disulphonic acid and the corresponding acylamino derivatives, there are obtained textile materials which fluoresce in ultraviolet light and which accordingly have an attractive white appearance.

Also in the specification of United States application Serial No. 381,856 vested in the Alien Property Custodian and published May 11, 1943, it was proposed to treat textile materials with colourless or slightly coloured stilbene derivatives particularly with such stilbene derivatives as do not contain a free amino group but which do contain at least one 1:3:5-triazine nucleus. It was proposed to prepare such compounds by causing 1:3:5-triazyl chloride dissolved in acetone to react with an aqueous solution of the sodium salt of diaminostilbene disulphonic acid at about 0-5° C. After the reaction, in which the solution had been maintained essentially neutral, was complete, the amine or phenol (with which it was desired to react some or all of the residual chlorine atoms attached to the triazine nucleus) was caused to flow slowly into the reaction solution, if necessary, at a somewhat higher temperature (10-30° C.). Finally soda could be added to the mixture and the whole was boiled in order to saponify any residual chlorine atoms present in the 1:3:5-triazine nuclei.

None of the compounds mentioned in the above specification for use in the treatment of textile materials contains a dimethylamino or morpholino group attached to a triazine nucleus.

I have now found that the 4:4'-di-triazyl-diaminostilbene-2:2'-disulphonic acid compounds containing dimethylamino or morpholino groups attached to the triazine nuclei, have a whitening effect on textiles superior to that obtained with the previously known derivatives of 4:4'-diaminostilbene-2:2'-disulphonic acid.

According to my invention therefore I provide a process for the manufacture of new substances for textile treatment, which comprises reacting two molecular proportions of cyanuric chloride with, in any order, one molecular proportion of 4:4'-diaminostilbene-2:2'-disulphonic acid or a salt thereof, two molecular proportions of dimethylamine or morpholino and two mo-

2 lecular proportions of a primary or secondary aliphatic amine or of a primary aromatic amine which may carry as nuclear substituents one or more alkyl radicals and/or one radical selected from the class comprising —OH, —OMe, —NH-acetyl, —NH-benzoyl and —SO$_2$NH$_2$.

As suitable amines for use in the process of the invention there may be mentioned for example aniline, m-toluidine, p-xylidine, p-aminoacetanilide and monoethanolamine.

The invention is illustrated but not limited by the following examples in which the parts are by weight.

Example 1

To a suspension of 71.0 parts (0.1 mol) of the disodium salt of 4:4'-bis-(2:4-dichloro-1:3:5-triazyl (6))-diaminostilbene-2:2'-disulphonic acid prepared as described below, 18.6 parts (0.2 mol) of aniline are added. The mixture is heated at 50° C. and caustic soda is added from time to time as required to make and maintain the suspension neutral to Delta test paper (paper impregnated with 2:4-dinitrobenzene-azo-1-naphthol-3:6-disulphonic acid). The reaction is complete when no further acidity develops. This takes about one hour. 18 parts (0.4 mol) of dimethylamine are now added, and the mixture is heated at 95–100° C. for 5 hours. The disodium salt is precipitated by adding 400 parts of sodium chloride. It is filtered off and dried at 60° C. The product is a pale yellow solid.

The suspension of 71 parts of the disodium salt of 4:4'-bis-(2:4-dichloro-1:3:5-triazyl (6))-diaminostilbene-2:2'-disulphonic acid used in the above example is prepared as follows::

8 parts of caustic soda are added to a stirred mixture of 37 parts (0.1 mol) of 4:4'-diaminostilbene-2:2'-disulphonic acid in 240 parts of water. The clear solution so obtained is added to a suspension of cyanuric chloride (obtained by adding a solution of 36.8 parts (0.2 mol) of cyanuric chloride in 92 parts of acetone to 1600 parts of water) at 20–25° C. in 30 minutes. The suspension so obtained is stirred at 20–25° C. for 2 hours and 80 parts of 10% caustic soda solution is gradually added during this period so that the final mixture is only very slightly acid to Congo red test paper.

Example 2

Instead of the 18.6 parts of aniline used in Example 2, 21.4 parts of n-toluidine (0.2 mol) are used. The disodium salt produced is a pale yellow powder.

Example 3

Instead of the 18.6 parts of aniline used in Example 2, 30.0 parts of p-amino-acetanilide are used. The disodium salt produced is a pale yellow powder.

Example 4

To a suspension of 71.0 parts (0.1 mol) of the disodium salt of 4:4'-bis-(2:4-dichloro-1:3:5-triazyl (6))-diaminostilbene - 2:2'-disulphonic acid 18.6 parts (0.2 mol) of aniline are added. The mixture is heated at 50° C. and caustic soda is added from time to time as required to make and maintain the suspension neutral to Delta test paper (paper impregnated with 2:4-dinitrobenzene-azo-1-naphthol-3:6-disulphonic acid). The reaction is complete when no further acidity develops. This takes about one hour. 34.8 parts (0.4 mol) of morpholine are now added, and the mixture is heated at 95–100° C. for 5 hours. The disodium salt is precipitated by adding 400 parts of sodium chloride. It is filtered off and dried at 60° C. The product is a pale yellow solid.

Example 5

Instead of the 18.6 parts of aniline used in Example 4, 21.4 parts of m-toluidine (0.2 mol) are used. The disodium salt produced is a pale yellow powder.

Example 6

Instead of the 18.6 parts of aniline used in Example 4, 30.0 parts of p-amino-acetanilide are used. The disodium salt produced is a pale yellow powder.

I claim:

1. Process for the manufacture of new textile whitening agents which comprises reacting two molecular proportions of cyanuric chloride with one molecular proportion of a substance from the group consisting of 4:4'-diaminostilbene-2:2'-disulphonic acid and salts thereof, two molecular proportions of an amino compound from the group consisting of dimethylamine and morpholine and two molecular proportions of an amino compound from the group consisting of alkyl amino and monocyclic aryl amino compound.

2. A compound represented by the formula

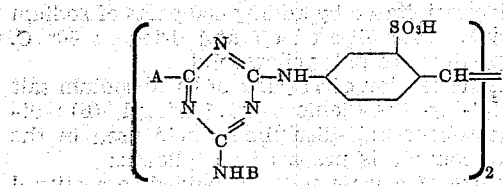

and salts thereof, wherein A is a radical selected from the group consisting of

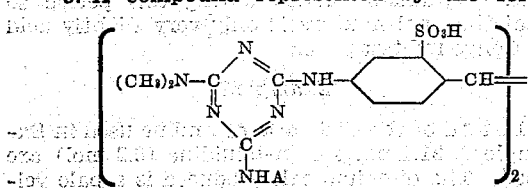

and B is a radical selected from the group consisting of alkyl and monocyclic aryl radicals.

3. A compound represented by the formula

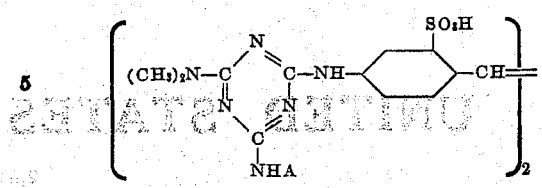

wherein A is an aryl group.

4. A compound represented by the formula

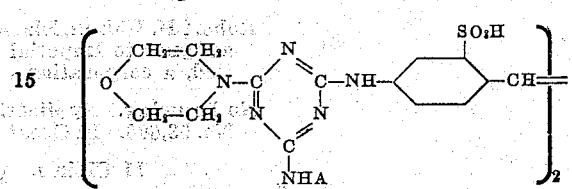

wherein A is an alkyl group.

5. A compound represented by the formula

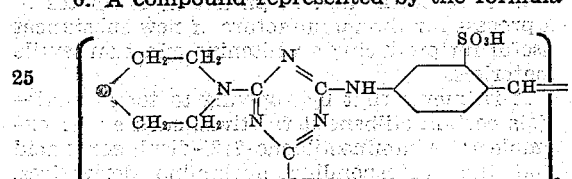

wherein A is an aryl group.

6. A compound represented by the formula

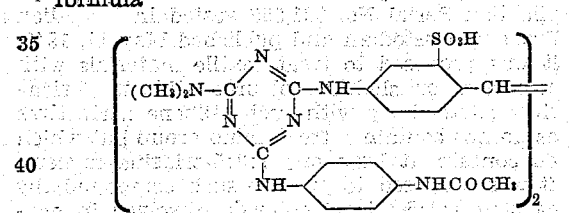

wherein A is an alkyl group.

7. A new whitening agent represented by the formula

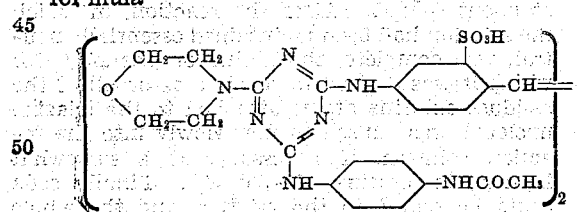

8. A new whitening agent represented by the formula

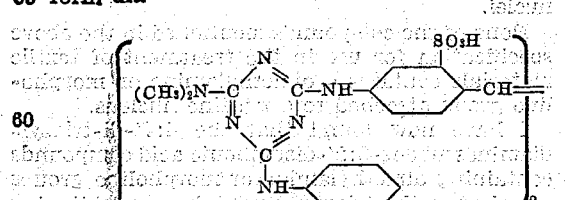

9. A new whitening agent represented by the formula

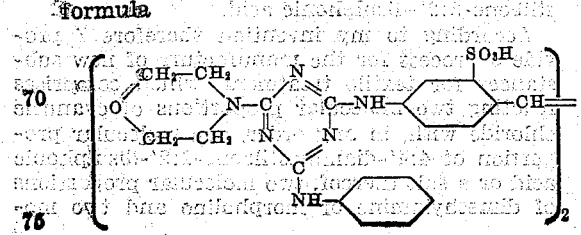

10. A new whitening agent represented by the formula

11. A new whitening agent represented by the formula
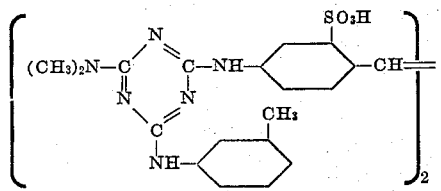
ROBERT H. WILSON.
REFERENCES CITED
The following references are of record in the file of this patent:
UNITED STATES PATENTS
| Number | Name | Date |
| --- | --- | --- |
| 2,171,427 | Eggert | Aug. 29, 1939 |
| 2,235,480 | Graenacher | Mar. 18, 1941 |
| 2,376,743 | Wendt | May 22, 1945 |
OTHER REFERENCES
Alien Prop. Custodian Publication Ser. No. 381,856, published May 11, 1943.